United States Patent [19]

Schuster

[11] Patent Number: 5,502,340
[45] Date of Patent: Mar. 26, 1996

[54] MEASURING PROCESS FOR OBTAINING A SWITCHING COMMAND IN A RAPID CHANGEOVER DEVICE

[75] Inventor: Norbert Schuster, Forchheim, Germany

[73] Assignee: Siemens Aktiengesellschaft, Müchen, Germany

[21] Appl. No.: 211,113

[22] PCT Filed: Sep. 21, 1992

[86] PCT No.: PCT/DE92/00821

§ 371 Date: Mar. 21, 1994

§ 102(e) Date: Mar. 21, 1994

[87] PCT Pub. No.: WO93/06644

PCT Pub. Date: Apr. 1, 1993

[30] Foreign Application Priority Data

Sep. 20, 1991 [DE] Germany ............ 41 31 815.3

[51] Int. Cl.$^6$ .................................................. H02J 3/00
[52] U.S. Cl. .................. 307/87; 307/64; 307/84
[58] Field of Search ...................... 307/19, 23, 29, 307/64–66, 85–87

[56] References Cited

U.S. PATENT DOCUMENTS

| | | | |
|---|---|---|---|
| 4,310,771 | 1/1982 | Wyatt et al. | 307/64 |
| 4,311,919 | 1/1982 | Nail | 307/64 |
| 4,403,292 | 9/1983 | Ejzak et al. | 307/29 |
| 4,965,463 | 10/1990 | Maruyama et al. | 307/87 |
| 4,967,096 | 10/1990 | Diemer et al. | 307/19 |

FOREIGN PATENT DOCUMENTS

| | | |
|---|---|---|
| 2108307 | 8/1972 | Germany. |
| 3742028 | 6/1989 | Germany. |

OTHER PUBLICATIONS

IEEE Transactions on Power Delivery, Bd. 4, Nr. 3, Jul. 1989, New York US pp. 1602–1609 Benmouyal 'an adaptive sampling–interval generator for digital relaying.

*Primary Examiner*—William M. Shoop, Jr.
*Assistant Examiner*—Jonathan S. Kaplan
*Attorney, Agent, or Firm*—Kenyon & Kenyon

[57] ABSTRACT

A measuring process for obtaining a switching command in a rapid changeover device in which an abrupt change in the voltage in a consumer device is detected and a voltage difference is formed using the voltage of a power supply source to be connected and the voltage at the consumer device, and the switching command for a power switch is issued taking its response time into account if, at the time of the changeover, a voltage difference with a value below a permissible maximum is pre-calculated. To perform such a measuring process as accurately and as quickly as possible, the peak values and the frequencies and the phase relation of the voltages in the first and second power supply sources are found when disconnecting the consumer device. After the disconnection of the consumer device, the time change of the frequency and the time change of the magnitude of the voltage at the consumer device are found. These values are then used to calculate the moment of changeover.

2 Claims, 1 Drawing Sheet

MEASURING PROCESS FOR OBTAINING A SWITCHING COMMAND IN A RAPID CHANGEOVER DEVICE

BACKGROUND OF THE INVENTION

The present invention relates to a process for obtaining a switching command in a rapid changeover device for switching over a consumer installation, as needed, from a first power supply source to a second power supply source. After the consumer installation is disconnected from the one power source, a differential voltage is formed in the consumer installation from the voltage of the second power supply source and from the voltage at the consumer installation. The switching command is then given, in view of the inherent response time of the power switch effecting the changeover, when a differential voltage is pre-calculated for the moment of changeover with a value below a permissible maximum value.

A process of this type can be inferred from the German Patent Publication No. 21 08 307 C3 (hereinafter "the 307 publication"). In a process such as the one inferred from the '307 publication, an auxiliary voltage proportional to the mean differential voltage is formed from the voltage of the power supply source to be connected at any one time and from the voltage at the consumer installation. Additional auxiliary voltages are formed from this auxiliary voltage through repeated differentiation, so that the auxiliary voltages represent single terms of a series expansion, preferably of a Taylor series. The auxiliary voltages are generated proportionally to the product from the derivative of the particular order and to a quantity of a corresponding power, the quantity representing a selectable time factor. The thus formed auxiliary voltages are added and compared to a specified voltage to obtain a switching command. If the selectable time factor corresponds to the inherent response time of the switch effecting the changeover, then the known process allows a changeover to be produced in view of the inherent response time of the particular switch, at an instant when the sum of the auxiliary voltages falls below a specified value, so that the changeover is substantially bumpless (i.e., seamless).

Rapid changeover devices safeguard the power supply of important consumer installations, particularly for motor configurations. Rapid changeover devices are essential for auxiliary switchgear used in power stations, for which at least two power supply sources are almost always provided, the power supply sources being as independent as possible from one another. In such auxiliary switchgear, all machines and units required for the operation are supplied from a station-service bus of a generator block. During start-up of the generator block, the required power is obtained from the power supply system. After the start-up operation is complete, the internal power consumption requirement is obtained from the block itself.

In the case of a malfunction (for example a short-circuit, a drop in frequency or voltage caused by an overload, etc.) in the supply system or the generator, a secondary power supply source must be switched to within a few seconds, to continue to safeguard the internal power consumption of the power station. During such a changeover operation, the switch to the connected power supply source is first opened, thereby disconnecting the consumer installation from the incoming power supply. As a result, the voltage at the consumer installation decreases with respect to frequency and amount with a time constant specific to the installation. After the consumer installation is disconnected from the one power supply source, the changeover to the secondary power supply source must be made as quickly as possible. However, this can only happen when the differential voltage between the secondary power supply source to be connected to the system and the consumer installation lies below an adjustable value. In this case, the inherent response time of the power switch effecting the changeover at any one time must be accounted for.

Starting from the known measuring process described above, the object of the present invention is to provide a measuring process for obtaining a switching command in a rapid changeover device, which will allow the differential voltage to be calculated with relative accuracy, in view of the inherent response time of the power switch effecting the changeover at any one time, so that the changeover from the first power supply source to the secondary power supply source will be bumpless (i.e., seamless) to the greatest possible extent.

SUMMARY OF THE INVENTION

The present invention solves the above mentioned objective in the case of a measuring process of the type indicated at the outset by determining the peak values and the frequencies of the voltages at the consumer installation and at the second power supply source, and the phase relation of the voltage at the second power supply source relative to the phase relation of the voltage at the consumer installation when the consumer installation is disconnected. The resulting abrupt change in the voltage at the consumer installation is acquired. After the consumer installation is disconnected, the change in the frequency and the change in the amount of the voltage at the consumer installation are determined as a function of time. Subsequently, to calculate the instant of the changeover, the differential voltage defined by the expression:

$$U_{2max} - (1-c) \cdot (1-b \cdot t_s) U_{3max} \exp(j(\omega_2 - \omega_3) t_s - 0.5 \cdot a \cdot t_s^2 + \Gamma_2 - \Gamma_1)$$

where $\omega_2 = 2 \cdot \Pi f_2$ and $\omega_3 = 2 \Pi f_3$, is evaluated.

The important advantage of the measuring process according to the present invention is the ability to determine the amount of the differential voltage, while fully allowing for the magnitudes and the phase relations, as well as the frequencies of the voltage from the secondary power supply source, and of the voltage at the consumer installation, so that by simultaneously considering the inherent response time of the power switch effecting the changeover, a switching command can become effective when the differential voltage lies below a comparatively low specified value. As a result, a substantially bumpless (i.e., seamless) changeover is achieved.

In the measuring process according to the present invention, the change in the frequency of the voltage at the consumer installation can be determined as a function of time in a novel way to more simply implement the process and to achieve the greatest possible accuracy and speed. After the consumer installation is disconnected, the voltage at the consumer installation is sampled with a sampling frequency being a multiple of the frequency of the voltage at the consumer installation. When measuring signals, corresponding to the sine and cosine component of the fundamental wave of the voltage at the consumer installation are acquired from the sampled values at a sampling instant in a Fourier filter, the phase relation of the corresponding complex measurable quantity is determined using the measuring signals. The prevailing frequency of the voltage at the consumer installation is determined from the difference between the phase relation of another complex measurable quantity acquired at a corresponding sampling instant in a following half wave of the voltage at the consumer installation and the phase relation of the one complex measurable quantity according to the relation:

$$f_{3meas,i+1}=(\Delta\Phi \cdot f_{3meas,i})/\Pi$$

where $f_{3meas,i}$ indicates the frequency of the voltage at the consumer installation determined in the preceding measuring cycle.

The process for measuring the change in the frequency of a voltage can also be advantageously applied by itself.

The change in the amount of voltage at the consumer installation after it is disconnected from the one power supply source can usually be determined by making a voltage comparison in equidistant time intervals.

DETAILED DESCRIPTION

Figure 1:
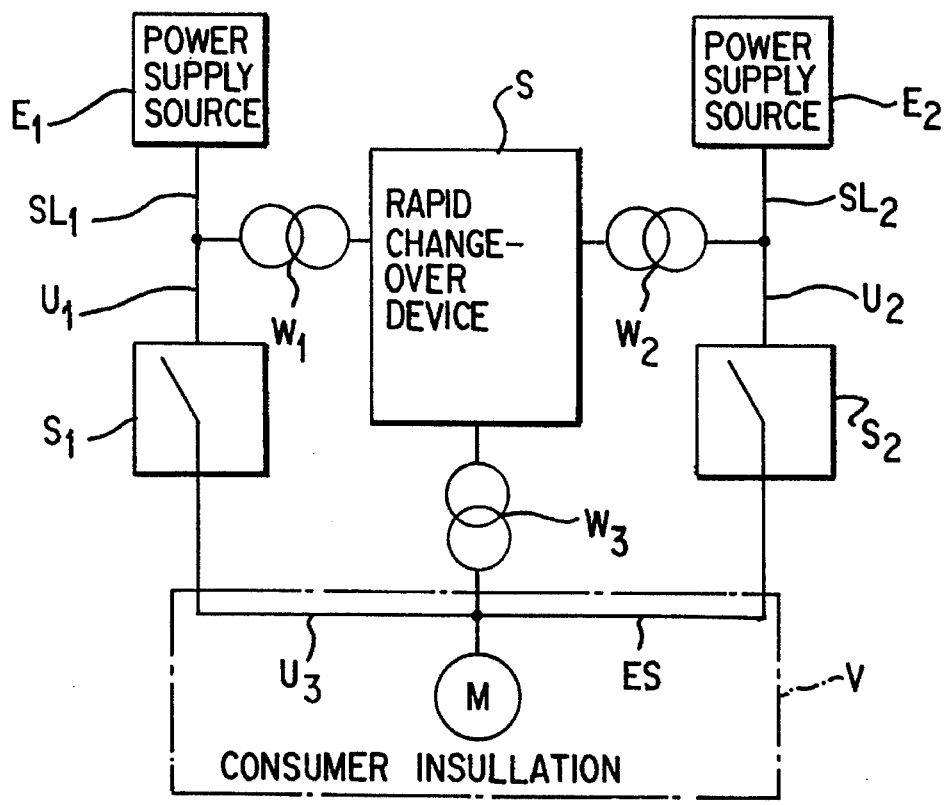
FIG. 1 depicts a power plant installation including a rapid changeover device which operates according to the process of the present invention.

As FIG. I reveals, a rapid changeover device S is connected via a voltage transformer $W_1$ to a supply line $SL_1$ (voltage $U_1$). Through the supply line $SL_1$, a consumer installation V is supplied from a power supply source $E_1$ by means of a power switch $S_1$. The consumer installation V contains a station service bus ES and, for example, a motor M. The consumer installation V may be linked via a second power switch $S_2$ and a second power supply line $SL_2$ to a second power supply source $E_2$. A voltage corresponding to the voltage $U_2$ on the second power supply line $SL_2$ can be acquired by the rapid changeover device S via second voltage transformer $W_2$. Finally, the voltage $U_3$ at the consumer installation V can be acquired by the rapid changeover device S via a third voltage transformer $W_3$.

To further clarify the process according to the present invention, in the following example it is assumed that a changeover should be made from the one power supply source $E_1$ to the second power supply source $E_2$, because the power supply source $E_1$ is experiencing fault conditions.

In the assumed case, before the power switch $S_1$ is actuated, the voltage $U_3$ at the consumer installation V (or at the station service bus ES) is equal to the voltage $U_1$ on the power supply line $SL_1$. Therefore, in an instantaneous value representation:

$$u_3=u_1=u_{1max} \cdot \sin(\omega_1 \cdot t + \Gamma_1) \quad (1)$$

or in a polar representation:

$$U_3=U_1=U_{1max} \cdot \exp(j(\omega_1 \cdot t + \Gamma_1)) \quad (2)$$

where, $u_{1max}$ denotes the peak value of the voltage $U_1$ $\omega_1$ denotes the angular frequency $(2 \cdot \Pi \cdot f_1)$ of the voltage $U_1$, and $\Gamma_1$ denotes the phase angle of the voltage $U_1$.

Accordingly, the voltage of the additional power supply source $E_2$ to be connected to the system can be expressed by the following relations:

$$u_2=u_{2max} \cdot \sin(\omega_2 t + \Gamma_2); \quad (3)$$

or $$U_2=U_{2max} \cdot \exp(j(\omega_2 t + \Gamma_2)), \quad (4)$$

where, $u_{2max}$ denotes the peak value of the voltage $U_2$ $\omega_2$ denotes the angular frequency $(2 \cdot \Pi \cdot f_2)$ of the voltage $U_2$, and $\Gamma_2$ denotes the phase angle of the voltage $U_2$.

At the instant the consumer installation V is disconnected from the one power supply source $E_1$ (i.e., when the power switch $S_1$ is opened) the voltage $U_3$ at the consumer installation V experiences an abrupt change which can be expressed by the following equation (5)

$$U_3=c \cdot U_1. \quad (5)$$

After the consumer installation V is disconnected from the one power supply source $E_1$, speed of rotation of the motor M decelerates due to friction losses. The retarding torque can be regarded as the average torque of all attached drives, and leads to a temporal change in the frequency in the sense of a reduction in frequency. This has been described in the '307 publication. (See column 3, paragraph 2). The temporal change in the frequency occurs linearly over time, so that the angular frequency $\omega_3$ of the voltage $U_3$ at the consumer installation V can be described by the following relation (6):

$$\omega_e = \omega_1 - \propto t$$

where, $\propto$ denotes a constant indicating the change in the frequency of the voltage $U_3$ at the consumer installation V as a function of time, and t denotes the time that elapsed since opening the power switch $S_1$.

After the abrupt change has taken place, the voltage $U_3$ also decreases linearly, which can be described by the factor 1−b·t, where b specifies the decrease factor of the voltage $U_3$. Thus, the characteristic waveshape of the voltage $U_3$ at the consumer installation V can be indicated in an instantaneous value by the following relation:

$$u_3=u_{1max} \cdot (1-c) \cdot (1-c) \cdot (1-bt) \cdot \sin(\omega_1 t + \Gamma_1 - 0.5 \cdot \propto \cdot t^2). \quad (7)$$

The polar representation of the instantaneous voltage $U_3$ at the consumer installation can be determined by the following equation:

$$U_3=U_{1max} \cdot (1-c) \cdot (1-bt) \cdot \exp(j(\omega_1 \cdot t + \Gamma_1 - 0.5 \cdot \propto \cdot t^2)). \quad (8)$$

As explained above, at the instant the additional power switch $S_2$ is switched on or closed, the differential voltage $\Delta U$ formed from the voltage $U_2$ of the additional power supply source and from the voltage $U_3$ at the consumer installation must be smaller than a predetermined value $\Delta U_{permissible}$. This can be expressed by the following relation (9):

$$\Delta U_3=|U_2-U_3| \leq \Delta U_{permissible}. \quad (9)$$

Therefore:

$$\Delta U=|U_{2max}-(1-c)\cdot(1-bt_2)U_{1max}\exp(j(\omega_2-\omega_1)\ t_2-0.5\cdot\infty\cdot t_s^2+\Gamma_{21}))|\leq\Delta U_{permissible} \qquad (10)$$

This demonstrates that the measuring process according to the present invention can be carried out to obtain a switching command when all quantities of the relation (10) indicated above have been determined.

No difficulties arise with respect to determining the quantities $U_{2max}$ or $U_{1max}$, because these quantities can be measured once and retained before the changeover process. The rapid change c in the voltage $U_3$ can likewise be measured and stored during the disconnect operation.

The change b in the voltage $U_3$ is easily determined as a function of time after the consumer installation V is disconnected from the one power supply source $E_2$ by making voltage comparisons in equal time intervals and is likewise stored as a fixed quantity. Also, no difficulties are entailed in determining the angular frequencies $\omega_2$ and $\omega_1$ before the beginning of the changeover process and these measured quantities are also retained. The quantity $t_s$ describes the inherent response time of the power switch $SL_1$ or $SL_2$ being used and is a known quantity.

Also determining the phase angle $\Gamma_2-\Gamma_1$ between the voltages $U_2$ and $U_1$ immediately before the changeover operation does not entail any difficulties. This phase angle is also stored.

Thus, in light of the equation indicated above, to obtain a switching command, only the quantity $\propto$, which describes the change in the frequency of the voltage $U_3$ as a function of time after the consumer installations V have been disconnected from the power supply source $E_1$ needs to be defined. The process defines the quantity by:

Sampling the voltage $U_3$ with a sampling frequency $f_A$, which is a multiple of the frequency $f_3$ of the voltage $U_3$. N sampling instants result then for each period of the voltage $U_3$. The frequency to be measured results then as:

$$f_{meas}=N\cdot f_A. \qquad (11)$$

A phasor can be formed from the sampled values of the voltage $U_3$ in the complex plane, in that the individual sampled values are supplied to a Fourier filter. In this Fourier filter, the sine and cosine component of the fundamental wave are acquired. This process is advantageous since it is insensitive to harmonic oscillations and eliminates the steady (i.e., zero-frequency, D.C.) component, for example the sampling offset. For example, if twelve samples a(k) are made for each period of the voltage $U_3$, and if a sampling frequency of $f_A=600$ Hz is used, then the following filter specification results, in that sampling values of one period of the system frequency $U_3$ are summed with correction factors. The following summation results for the sine component s(k) at the output of the sine filter:

$$s(k)=0.5\cdot a(k-1)+\tfrac{7}{8}\cdot a(k-2)+a(k-3)+\tfrac{7}{8}\cdot a(k-4)+0.5\cdot a(k-5)-0.5\cdot a(k-7)-\tfrac{7}{8}\cdot a(k-8)-a(k-9)-\tfrac{7}{8}\cdot a(k-10)-0b\ 0.5\cdot a(k-11) \qquad (12)$$

The following series (summation and subtraction) results for the cosine component c(k):

$$c(k)=a(k)+\tfrac{7}{8}\cdot a(k-1)+0.5\cdot a(k-2)-0.5\cdot a(k=4)-\tfrac{7}{8}\cdot a(k-5)-a(k-6)-\tfrac{7}{8}\cdot a(k-7)-0.5\cdot a(k-8)+0.5\cdot a\ (k-8)+0.5\cdot a(k-10)+\tfrac{7}{8}\cdot a(k-11) \qquad (13)$$

Figure 2:
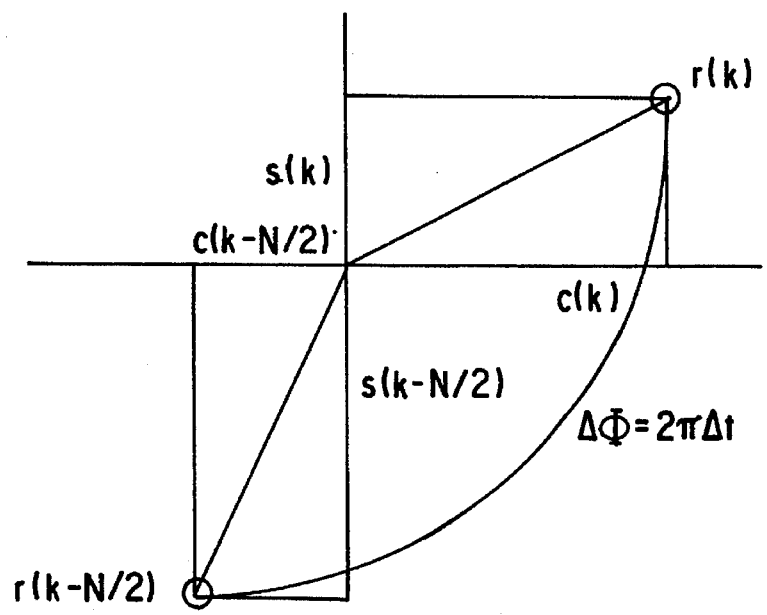
FIG. 2 is a diagram which clarifies the process for measuring a change in frequency.

In each of these series, a(k-n) describes the sampling value, which lies timewise by one value n before the current sampling value a(k). The output signals from the sine and cosine filter are in phase quadrature. A vector r(k), whose coordinates are described by c(k) and s(k), results in the complex plane (see FIG. 2). In the time at, this vector r(k) covers an angular difference of $\Delta\Phi$. The frequency $f_{meas,i+1}$ of the sampled signal can be easily calculated from this as:

$$f_{meas,i+1}=\Delta\Phi/(2\cdot\Pi\cdot\Delta t). \qquad (14)$$

To calculate the prevailing frequency using this equation, it is necessary to define $\Delta t$. This quantity can be expressed by the sampling frequency $f_A$ and by the number of the sampled values N for each period of the voltage $U_3$. The angular difference is developed from the position of two vector positions, which are identically situated with respect to the sampling instants in successive half waves of the voltage $U_3$. Given a system frequency of 50 Hz, the position of two vector positions, which are spaced apart by 10 ms is preferably used. Given a sampling frequency of $f_A=600$ Hz, this 10 ms time corresponds to N=6 sampled values or to a rotational angle of $\Delta\Phi=180°$. The sampling frequency $f_A=600$ Hz leads to one complete revolution of the vector in 20 ms, when the signal frequency $f_{meas,i}$ corresponds to the system frequency of 50 Hz. Thus, $\Delta t$ can be described by the following relation (15) as:

$$\Delta t=1/f_A\cdot N/2=1/(2\cdot f_{meas,i}) \qquad (15)$$

In equation (15)—as already mentioned above—the calculation is made at the beginning of the measurement of the change in frequency with $f_{meas,i}=50$ Hz as a basis.

Thus, the prevailing frequency of the voltage $U_3$ at the consumer installation V can then be expressed from equations (14) and (15) through the following relation (16) as:

$$f_{meas,i+1}=(\Delta\Phi\cdot f_{meas,i})/\Pi \qquad (16)$$

In this manner, measurements of the current frequency of the voltage $U_3$ can be made one after the other in the same time intervals. The change in the frequency $\propto$ can then be simply calculated as a function of time from these measurements through the following relation (17):

$$\propto=(f_{meas,i}-f_{meas,i+1})/\Delta t \qquad (17)$$

All quantities in equation (10) indicated above are then determined, and the prevailing differential voltage $\Delta U$ can then be ascertained arithmetically. If the prevailing differential voltage $\Delta U$ falls below a specified, permissible, largest value of $\Delta U_{permissible}$, then a switching command is given to the power switch $S_2$, causing it to connect the consumer installation V to the additional power supply source at an instant in which the differential voltage $\Delta U$ is smaller than the permissible value.

With respect to defining the quantity $\propto$ (or with respect to measuring the change in the frequency of the voltage $U_3$), given a larger deviation in the frequency of this voltage from the system frequency Hz, the sampling frequency should be corrected accordingly, to maintain the accuracy of the process. This correction is realized by altering the sampling frequency, and by storing a new numerical value at any one time in the counter which produces the sampling rate. This numerical value can be stored in a table.

I claim:
1. A process for issuing a switching command in a rapid changeover device for switching a consumer installation from a power supply source to a second power supply source by means of a power switch having an inherent response time $t_s$, the process comprising steps of:

a) disconnecting the consumer installation from the power supply source;

b) when disconnecting the consumer installation from the power supply source, (i) measuring a peak value $U_{3max}$ and a frequency $f_3$ of the voltage $U_3$ at the consumer installation, a peak value $U_{2max}$ and a frequency $f_2$ of the voltage $U_2$ at the second power supply source, and a relation between a phase angle $\Gamma_3$ of the voltage at the consumer installation and a phase angle $\Gamma_2$ of the voltage at the second power supply source;

(ii) storing the peak value $U_{3max}$ and the frequency $f_3$ of the voltage $U_3$ at the consumer installation, the peak value $U_{2max}$ and the frequency $f_2$ of the voltage $U_2$ at the second power supply source, and the relation between a phase angle $\Gamma_3$ of the voltage at the consumer installation and a phase angle $\Gamma_2$ of the voltage at the second power supply source;

(iii) measuring and storing an abrupt change $cU_{3max}$ in the voltage $U_3$ at the consumer installation;

c) after the consumer installation is disconnected from the power supply source, measuring a change (a) in frequency $f_3$ and a change (b) in voltage $U_3$ at the consumer installation as a function of time;

d) subsequently forming a differential voltage signal $\Delta U$ from the voltage of the second power supply source $U_2$ and from the voltage at the consumer installation $U_3$, the differential voltage $\Delta U$ being defined by the expression:

$$|U_{2max} - (1-c) \cdot (1 - b \cdot t_2) U_{3max} \exp(j(\omega_2 - \omega_3)t_2 - 0.5 a t_s^2 + \Gamma_2 - \Gamma_1)|$$

where,
$\omega_2 = 2 \cdot \Pi f_2$ and
$\omega_3 = 2 \Pi f_3$;

e) issuing a switch command to effect a switchover such that, in view of the inherent response time $t_s$ of the power switch, the switchover will occur when the differential voltage $\Delta U$ formed in step (f) is below a permissible maximum value.

2. The measuring process according to claim 1 wherein said step of measuring the frequency at the consumer installation comprises the sub-steps of:

i) sampling the voltage at the consumer installation $U_3$ with a sampling frequency $f_A$, the sampling frequency $f_A$ amounts to a multiple of the frequency $f_3$ of the voltage $U_3$ at the consumer installation;

ii) acquiring measuring signals from the sampled values at a sampling instant in a Fourier filter, the measuring signals correspond to sine and cosine component of a fundamental wave of the voltage at the consumer installation $U_3$;

iii) measuring a phase relation of a corresponding complex measurable quantity with the measuring signals acquired in sub-step (ii); and iv) measuring the prevailing frequency of the voltage at the consumer installation from the difference $\Delta \Phi$ between the phase relation of another complex measurable quantity at a corresponding sampling instant in a following half wave of the voltage at the consumer installation $U_3$ and the phase relation of the one complex measurable quantity, according to the relation:

$$f_{meas,i+1} = (\Delta \Phi \cdot f_{3meas,i}) / \Pi,$$

where $f_{3meas,i}$ indicates the frequency of the voltage $U_3$ at the consumer installation measured in the preceding measuring cycle.

* * * * *